United States Patent [19]
Elliott et al.

[11] Patent Number: 5,904,317
[45] Date of Patent: May 18, 1999

[54] METHOD FOR ADJUSTING STIFFNESS AND ACOUSTIC PROPERTIES OF AN EXTERNALLY MOUNTABLE SPACECRAFT EQUIPMENT MODULE

[75] Inventors: Lee E. Elliott, Rancho Palos Verdes; Alfred Barrett, Santa Monica, both of Calif.

[73] Assignee: TRW Inc., Redondo Beach, Calif.

[21] Appl. No.: 08/770,478

[22] Filed: Dec. 20, 1996

[51] Int. Cl.$^6$ ................................................ B64G 1/66
[52] U.S. Cl. ................. 244/1 N; 244/158 R; 248/638
[58] Field of Search ........................... 244/158 R, 158 A, 244/1 N; 248/638

[56] References Cited

U.S. PATENT DOCUMENTS

| | | | |
|---|---|---|---|
| 4,533,100 | 8/1985 | Paseri | 244/158 R |
| 5,027,892 | 7/1991 | Bannon et al. | 244/158 R X |
| 5,314,146 | 5/1994 | Chicoine et al. | 244/158 R |
| 5,332,188 | 7/1994 | Davis et al. | 248/638 X |
| 5,369,952 | 12/1994 | Walters | 248/638 X |
| 5,474,262 | 12/1995 | Fiore | 244/158 A |
| 5,566,919 | 10/1996 | Shepard | 248/638 X |
| 5,734,246 | 3/1998 | Falangas | 248/638 X |
| 5,755,406 | 5/1998 | Aston et al. | 244/158 X |

FOREIGN PATENT DOCUMENTS 2018211  2/1979  United Kingdom.

OTHER PUBLICATIONS

H. Nalisse, et al., "Panel Dynamic Response to a Reverberant Acoustic Field," AIAA Journal, vol. 33, No. 9, Sep. 1995, Canada, pp. 1590–1596.

*Primary Examiner*—William Grant
*Attorney, Agent, or Firm*—Michael S. Yatsko

[57] ABSTRACT

A technique for reducing the acoustic response of a spacecraft electronics equipment module that is structurally and thermally independent of a core spacecraft structure to which it can be mounted. The module takes the form of a thermal radiation panel on which electronic components are directly mounted. The panel is adjusted in stiffness to reduce its dynamic vibration response to acoustics and launch transients. These adjustments are facilitated by the external mounting of the panel to the core structure, preferably using a statically determinate mount that renders the module even less susceptible to vibration transferred from the core structure. External mounting removes the panel from the primary structure load path, which provides the freedom to adjust the stiffness as desired. The use of smaller than conventional equipment panels renders them less responsive to acoustic vibration because the dimensions of the panels are very much less than the wavelengths of the low-frequency acoustic energy that is of concern when launching the spacecraft. Other steps to minimize the vibration response include adding perforations to the equipment panels, providing an air gap between adjacent panels, adjusting the bending stiffness of the panels to reduce acoustic coupling, and damping the vibrations in the panels.

9 Claims, 1 Drawing Sheet

METHOD FOR ADJUSTING STIFFNESS AND ACOUSTIC PROPERTIES OF AN EXTERNALLY MOUNTABLE SPACECRAFT EQUIPMENT MODULE

BACKGROUND OF THE INVENTION

This invention relates generally to modular spacecraft engineering and, more particularly, to spacecraft electronic equipment modules that can be externally mounted on a core spacecraft structure. Equipment panels in conventional spacecraft have had high vibration responses due to acoustic conditions during launch, launch transients transmitted through the spacecraft structure, or both. These high vibration responses have adversely affected electrical and mechanical components mounted on the panels, and the panel structure itself. No serious attempt has been made to minimize the vibration response. Instead, the electrical components were designed to be compatible with whatever vibration environment the panels provided. It will be helpful to review, by way of further background, the nature of electronic equipment panel design for spacecraft prior to the present invention.

Conventional spacecraft designs have placed electronic equipment on panels located inside box-like modules, with the panels typically forming the walls of the modules. The modules are mounted onto a spacecraft and interconnected with complex interconnecting wiring. Heat dissipates from the electronics equipment into the mounting and radiates into space. The size of each module is determined in part by the heat radiating area needed to cool the equipment, so there is often unused volume within each module box or compartment. Because only one side of the equipment panel is used as a radiator, the modules often have to be very large to maintain desired operating temperatures. A related problem is that accessing equipment requires the removal of panels from the equipment compartment. Not only are modules of this type bulky to accommodate in a launch vehicle and difficult to access for servicing, but they typically need to be coupled to other thermal radiator panels, through heat-conducting pipes, to provide overall thermal management of the spacecraft.

Further, because the box modules are rigidly bolted to the core structure of the spacecraft, thermally induced stresses are a significant problem because of temperature differences between the modules and the spacecraft core structure. In brief, these conventional equipment modules are structurally and thermally dependent on the spacecraft core structure, and the overall design of the spacecraft must take into account the thermal requirements of each module and the structural forces resulting from the presence of each module.

Because of the design limitations of prior equipment panels for spacecraft, and the manner in which they have been housed and mounted, no serious consideration has been given to managing the vibration environment of the equipment. The vibration environment has been aggravated by the use of rigid, statically indeterminate mounting of the equipment to the spacecraft core structure. Launch transients are inevitably transmitted to the electronic equipment through this type of mounting. Further, the use of relatively large equipment panels for appropriate thermal management has resulted in high vibration responses to acoustic energy generated at launch. It will be appreciated from the foregoing that there is a need for improvement in the area of vibration management in spacecraft, especially as it concerns electronic equipment panels. The present inventions addresses this problem and has additional advantages that will become apparent from the following summary.

SUMMARY OF THE INVENTION

The present invention resides in a method for reducing vibration response in a spacecraft equipment module, comprising the step of selecting adjusting the natural vibration frequencies of an equipment panel connected to the spacecraft by panel supports, to minimize dynamic response to acoustic noise and launch transients transmitted through the spacecraft. The adjusting step is effected by adjusting the stiffness of a selected combination of the panel and the panel supports to accommodate a known equipment weight distribution on the panel and a desired range of vibration frequencies. The method may also include the step of mounting the equipment panel external to a core spacecraft structure. External mounting removes the panel from a primary structure load path and thereby facilitates the adjustments in stiffness.

Preferably, the step of mounting the equipment panel includes mounting it in a statically determinate manner, and thereby affirmatively removing the panel from the primary structure load path. More specifically, mounting includes precluding independent translatational movement of the entire equipment panel in three axial directions, and permitting limited independent movement of portions of the equipment panel in selected axial directions.

The method may also include the step of minimizing the bending stiffness of the panel, while maintaining the desired vibration response. Minimizing the bending stiffness reduces the acoustic response of the panel by reducing the coupling efficiency between the panel and surrounding air. The method may further include adjusting the lineal dimensions of the panel to be small relative to the wavelength of expected acoustic noise, whereby the panel cannot then be effectively loaded by low-frequency acoustic pressure.

Additional optional steps include providing an air gap between adjacent equipment panels on the same spacecraft, providing perforations in the equipment panel to reduce acoustic coupling to the panel, and damping vibrations in the equipment panel.

It will be appreciated from the foregoing that the present invention represents a significant advance in the field of modular spacecraft construction. In particular, the invention provides a technique for effectively reducing the vibration response of an equipment module at launch. As a result, the equipment and its supporting structure are placed at less risk from vibration and acoustic damage. Other aspects and advantages of the invention will become apparent from the following more detailed description, taken in conjunction with the accompanying drawings.

DESCRIPTION OF THE PREFERRED EMBODIMENT

Figure 1:
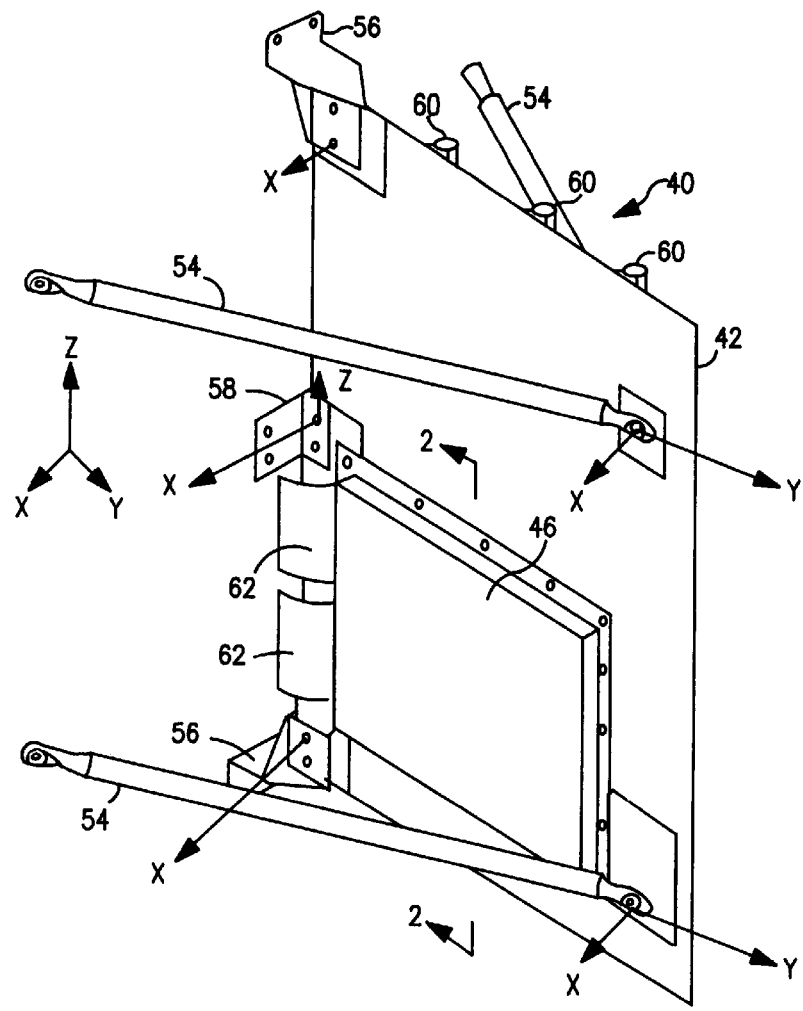
FIG. 1 is an isometric view of a spacecraft module and mounting structure in accordance with a preferred embodiment of the present invention.

As shown in the drawings for purposes of illustration, the present invention pertains to a spacecraft electronics equipment module and, more particularly, to techniques for reducing the vibration response in a spacecraft electronics equipment module. In the past, spacecraft modules have been housed in boxes rigidly mounted on a spacecraft core structure, and have been thermally and structurally dependent on the core structure. This arrangement has exposed the electronic and other equipment to acoustic vibration generated at launch, and to launch transients transmitted through the spacecraft structure.

In accordance with the invention, a spacecraft equipment module is constructed to be less structurally dependent on the spacecraft core structure to which it is attached. In the context of the invention, the term "less structurally dependent" does not mean that the module is a free-standing structure, but that it is attached to the core structure externally, preferably through a statically determinate mounting, which is designed primarily not to transmit thermally induced forces between the module and the core structure. Significantly, the external mounting removes the equipment module from a primary structural load path and allows it to be adjusted to reduce it dynamic vibration response. Moreover, the statically determinate mounting also serves to minimize the transmission of launch transients into the equipment panel. As will be further explained, the method of the invention has other features that further minimize the effects of both launch transients and acoustic vibration on the equipment panel.

Figure 2:
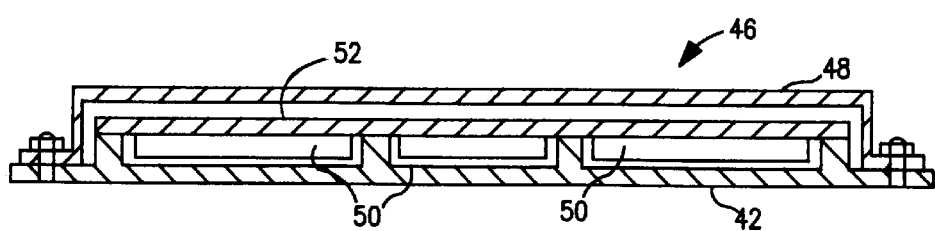
FIG. 2 is a cross-sectional view taken generally along the line 2—2 of FIG. 1 and depicting an electronics payload component housed on the spacecraft module.

By way of more specific example, FIG. 1 depicts the structural details of a spacecraft module 40 in accordance with the present invention. The module 40 in this example is structured on a flat, generally rectangular radiator panel 42, which, as will be seen in subsequent figures, attaches to a spacecraft core structure (not shown). The core structure can be very simple and light in weight because each module 40 is structurally self-sufficient from its points of attachment to the core structure 44. The module 40 includes an electronics element 46 mounted on the panel 42 and protected by a radiation cover 48. The electronics element 46, as shown in FIG. 2, includes electronic and RF elements 50 mounted on a circuit board 52 installed under the cover 48. The module 40 has a set of four struts 54, three of which are visible in the drawings, two end supporting brackets 56 and a central supporting bracket 58 for attachment to the core structure. The radiation panel 42 is nominally two-sided, for thermal radiation in two directions, but can be used as a single-sided radiator, as when mounted parallel to the supporting or core structure. Heat pipes, portions of which are shown at 60, can be used to increase the thermal efficiency and capacity of the radiator 42 by conducting heat over substantially the entire radiating surface.

Interfaces, shown diagrammatically at 62, are provided for connection to a "backbone" structure (not shown in FIG. 1), through which multiple modules are interconnected and attached to the core spacecraft structure. This disciplined interconnection interface replaces wiring harnesses presently used to interconnect modules. Although various configurations are contemplated, by way of example the interfaces 62 can provide payload, RF and power connections to the module 40, through connectors that are effectively shielded against electromagnetic interference (EMI). Each module 40 is designed to be structurally self-sufficient, to have integral thermal control and switching capability, and stand-alone power management capability. Data interface to the module 40 is made through a commercially available data bus (not shown).

For a particular system design, modules 40 can be added or deleted without impacting the complexity of the design at a system level. The only significant limiting factor is the maximum capacity of the core structure and any associated solar arrays. In effect, the modular design of the system tends to move complexity inside the individual module boundaries and dramatically reduce system level complexity and design requirements.

The statically determinate nature of the mounting system, comprising the struts 54 and the mounting brackets 56 and 58, limits the transmission of force between the module 40 and core structure. For discussion purposes, three axes, X, Y and Z are defined as follows. The X-axis direction is perpendicular to the surface of the panel 42, as indicated in the figure. The Y-axis and Z-axis directions are in the plane of the panel 42, with the Z-axis direction being parallel to the edge of the panel on which the brackets 56 and 58 are mounted. FIG. 1 shows the direction of forces (X, Y and Z) transferred by the struts 54 and mounting brackets 56 and 58. Although the mounting system is discussed in terms of its effect on thermally induced forces, it will be readily understood that statically determinate mounting has the added advantage of minimizing the transmission of launch transient vibrations from the spacecraft core structure to the equipment panel 42.

For clarity in the drawing, only a single force vector is indicated for each axis at each mounting point. It will be understood, of course, that the components of force along each axis may be in either direction (e.g., +X or −X) and that a force in one direction acting on the base panel 42 at a particular mounting point will be balanced by an equal and opposite force acting on the mounting bracket or strut at the same mounting point. For purposes of the following discussion, however, only the axis in which the force acts is significant, not the direction or polarity of the force along the axis.

The central bracket 58 transmits forces in the X and Z directions only. It can take the form of a right-angle bracket attached rigidly to the core structure and attached to the panel 42 to permit limited motion in the Y direction. This Y-direction motion can be accommodated by building the bracket 58 to include a flexure, or by providing slotted mounting holes in the portion of the bracket that attaches to the plate 42. This bracket 58 provides the only support for the panel in the Z direction. The other two brackets 56 at the top and bottom ends of the panel 42 provide for transmission of force only in the X direction, i.e., perpendicular to the panel. Each of these brackets consists of three-dimensionally bent plate, having a first planar section in the plane of the panel 42, for rigid attachment to the panel, a second planar section in the plane of the core structure, which is the X-Z plane, and a number of transition sections, which act as flexures, between the first and second planar sections. Limited movement of the panel 42 in the Z direction or the Y direction is not transmitted through the bracket 56, but results in bending of the bracket in its intermediate flexure sections, since these sections are designed to be easily bendable by forces in either of these directions. Movement of the panel 42 in the Z direction, for example, which would occur if the panel were to expand or contract in this direction as a result of thermal expansion or contraction, would simply result in bending of the brackets 56. Any force in the X direction, however, is transmitted through the brackets 56.

The struts 54 transmit forces only along their longitudinal axes. Because the struts are all aligned in X-Y planes, perpendicular to the plane of the base panel 42, these axial forces may be decomposed into forces in the X and Y directions. The forces in the X direction prevent movement of the panel 42 perpendicular to its faces. The forces in the Y direction prevent translational movement of the panel 42 in this direction. However, because the mounting brackets 56 and 58 do not transfer forces in the Y direction, the panel 42 can expand or contract in this direction.

In summary, the panel 42 is mounted in a statically determinate manner. Specifically, the panel 42 is secured in the Z direction only by the middle bracket 58, Therefore, differential expansion or contraction can occur in the Z direction without transmitting stress from or into the panel 42. Further, the panel 42 is secured in the Y direction only by the struts 54, so differential expansion or contraction can occur in this direction without transmitting stress from or into the panel. Finally, the panel 42 is supported in the X direction, perpendicular to its surface, by all five supporting elements, including the struts 54 and the brackets 56 and 58. Therefore, the panel 42 is secured in all three axis directions, but is permitted limited expansive or contractive movement in the plane of the panel itself.

Because the mounting structure minimizes the transfer of stress to or from the spacecraft as a result of differential thermal expansion, the material of the panel 42 can be selected without having to match it thermally with the material of the core structure of the spacecraft. The material of the panel 42 is, therefore, best chosen for its properties as a radiator and, may, for example, be a machined sheet of aluminum or some other suitable heat conductor. The aluminum material may be conveniently machined to include thickened portions and "standoffs" for attachment of the electronic components. The material of the core structure of the spacecraft may also be selected without regard to the module material, and a suitable lightweight structural material can be used. Selection of materials with different coefficients of thermal expansion, for the equipment panel and the core structure, would have caused significant structural problems prior to this invention.

Another important advantage of the module is that it can radiate heat from two sides, thereby minimizing the overall size and weight requirements for the panel. Each module panel 42 can be selected in size to meet the heat dissipation needs of the electronics unit 46, without carrying unnecessary weight on the spacecraft. The heat pipes 60 can be conveniently soldered to the panel 42 to maximize thermal conductivity.

The radiation cover 48, which is bolted rigidly to the panel 42, adds structural stiffness to the module, and therefore minimizes bending, especially when larger panels are used. The radiation cover 48 also enhances conduction of heat from the electronics elements 50 to the rest of the panel 42.

Although the statically determinate mounting system described above reduces the effect of launch transients on the equipment panel 42, there are a number of other features of the present invention that can be used in combination to reduce the effects of both the launch transients and acoustic vibration.

First, the vibration frequencies of the panel 42 can be adjusted to minimize the dynamic response to acoustics and launch transients. This is achieved by adjusting the stiffness of the panel, its supports, or both, to accommodate changes in equipment weight and to meet desired frequency requirements. These adjustments in stiffness may be conveniently made because the panel 42 is externally mounted and is, therefore, removed from the primary structural load path in the spacecraft. A related aspect of the invention is that the panel 42 may be adjusted in size, either length or width, to reduce vibration response. In general, the panel 42 should be small in relation to the wavelength of acoustic vibration. Because the equipment panels of the invention are inherently smaller than equipment panels of conventional spacecraft, they inherently have a lower response to acoustic vibrations at low frequencies. This effect can also be utilized to advantage when there are rows of closely spaced panels, by making sure that there is a sufficient air gap between adjacent panels.

The acoustic vibration response can also be further reduced by perforating the panel 42 and thereby reducing any pressure difference between the air on the two faces of the panel. Acoustic vibration response is further reduced by minimizing the bending stiffness of the panel itself. This adjustment acts to reduce the acoustic response by reducing the coupling efficiency between the air and the panel. However, the adjustment cannot be made independently of other considerations for choosing the stiffness of the panel and its supports to meet the requirements of equipment weight and desired frequencies of vibration.

Finally, the dynamic response of the panel 42 can be reduced by adding damping to the panel, its supporting structure, or both. The use of viscoelastic materials for passive damping of mechanical structures, and the use of active damping devices such as piezoelectric transducers, is now well known in the spacecraft design, but has not been applied to vibration damping of electronic equipment panels.

It will be appreciated from the foregoing that the present invention represents a significant advance in the field of spacecraft module design. In particular, the invention provides a technique for reducing the vibration response of an externally mountable equipment module. This reduction is achieved, in part, by use of an externally mounted panel, preferably using a structurally determinate mounting that reduces the vibrational energy transferred from the spacecraft core structure. The invention also provides other techniques for reducing acoustic coupling to the equipment panel, which may be combined to provide an equipment panel that is less subject to vibration from acoustic and launch transient sources. It will also be appreciated that, although a specific embodiment of the invention has been disclosed for purposes of illustration, various modifications may be made without departing from the spirit and scope of the invention. Accordingly, the invention should not be limited except as by the appended claims.

What is claimed is:

1. A method for reducing vibration response in a spacecraft equipment module on a panel, comprising the steps of:

adjusting the natural vibration frequencies of an equipment panel and a plurality of panel supports that connect the equipment panel to the spacecraft, to minimize dynamic response to acoustic noise and launch transients transmitted through the spacecraft, wherein the adjusting step is effected by adjusting the stiffness of a selected combination of the panel and the panel supports to accommodate a known equipment weight distribution on the panel and a desired range of vibration frequencies.

2. A method as defined in claim 1, and further comprising the step of mounting the equipment panel external to a core spacecraft structure, wherein the panel is removed from a primary structure load path to facilitate the adjustments in stiffness.

3. A method as defined in claim 2, and wherein the step of mounting the equipment panel includes mounting the equipment panel in a statically determinate manner, and thereby affirmatively removing the panel from the primary structure load path.

4. A method as defined in claim 2, wherein the step of mounting the equipment panel includes:

precluding independent translational movement of the entire equipment panel in three mutually perpendicular axial directions; and permitting limited independent movement of portions of the equipment panel in selected axial directions.

5. A method as defined in claim 1, and further comprising the step of minimizing the bending stiffness of the panel, while maintaining the desired vibration response, wherein minimizing the bending stiffness reduces the acoustic response of the panel by reducing the coupling efficiency between the panel and surrounding air.

6. A method as defined in claim 1, and further comprising the step of adjusting the lineal dimensions of the panel to be small relative to the wavelength of expected acoustic noise, whereby the panel cannot then be effectively loaded by low-frequency acoustic pressure.

7. A method as defined in claim 1, and further comprising the step of:

providing an air gap between adjacent equipment panels on the same spacecraft.

8. A method as defined in claim 1, and further comprising the step of:

providing perforations in the equipment panel to reduce acoustic coupling to the panel.

9. A method as defined in claim 1, and further comprising the step of:

damping vibrations in the equipment panel.

\* \* \* \* \*